United States Patent
Plasek et al.

(10) Patent No.: US 6,768,985 B1
(45) Date of Patent: Jul. 27, 2004

(54) METHOD AND APPARATUS FOR ADMINISTRATION OF DATABASE PARTITIONS

(75) Inventors: James M. Plasek, Shoreview, MN (US); John C. Rust, Brooklyn Park, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/385,771

(22) Filed: Aug. 30, 1999

(51) Int. Cl.[7] .............................................. G06K 17/30
(52) U.S. Cl. ........................... 707/2; 707/100; 711/163; 711/173
(58) Field of Search ......................... 707/1, 2, 3, 100, 707/9; 711/163, 164, 165, 166, 167, 168, 100, 52, 173; 713/200, 201; 709/203

(56) References Cited

U.S. PATENT DOCUMENTS

| | | | | |
|---|---|---|---|---|
| 5,659,756 A | * | 8/1997 | Hefferon et al. | 710/200 |
| 5,678,041 A | * | 10/1997 | Baker et al. | 707/9 |
| 5,713,018 A | * | 1/1998 | Chan | 707/10 |
| 5,751,949 A | * | 5/1998 | Thomson et al. | 713/201 |
| 5,768,519 A | * | 6/1998 | Swift et al. | 709/223 |
| 5,784,560 A | * | 7/1998 | Kingdon et al. | 709/201 |
| 5,813,012 A | * | 9/1998 | Chase et al. | 707/102 |
| 5,835,755 A | * | 11/1998 | Stellwagen, Jr. | 707/3 |
| 5,960,426 A | * | 9/1999 | Pirahesh et al. | 707/3 |
| 5,974,567 A | * | 10/1999 | Dickson, Jr. et al. | 714/27 |
| 5,991,879 A | * | 11/1999 | Still | 713/200 |
| 6,016,394 A | * | 1/2000 | Walker | 717/1 |
| 6,088,451 A | * | 7/2000 | He et al. | 380/25 |
| 6,236,996 B1 | * | 5/2001 | Bapat et al. | 707/9 |
| 6,275,852 B1 | * | 8/2001 | Filepp et al. | 709/220 |
| 6,281,894 B1 | * | 8/2001 | Rive | 358/1.14 |
| 6,330,555 B1 | * | 12/2001 | Weber | 707/2 |
| 6,349,310 B1 | * | 2/2002 | Klein et al. | 707/200 |
| 6,401,098 B1 | * | 6/2002 | Moulin | 707/102 |
| 6,449,643 B1 | * | 9/2002 | Hyndman et al. | 709/223 |
| 6,457,003 B1 | * | 9/2002 | Gajda et al. | 707/4 |

* cited by examiner

*Primary Examiner*—John Breene
*Assistant Examiner*—Cheryl Lewis
(74) *Attorney, Agent, or Firm*—Charles A. Johnson; Mark T. Starr; Crawford Maunu PLLC

(57) ABSTRACT

A method and apparatus for managing a database having a plurality of partitions are provided in various embodiments. The database is managed by users of a first user class and accessible to users of a second user class. Respective partition states are established for the partitions of the database, and access is provided to users of the first user class to partitions having a first partition state. Users of the second user class are denied access to partitons having the first partition state, and users of the second user class are provided access to partitions having a second partition state.

15 Claims, 6 Drawing Sheets

METHOD AND APPARATUS FOR ADMINISTRATION OF DATABASE PARTITIONS

FIELD OF THE INVENTION

The present invention generally relates to database management systems, and more particularly, to administering a partitioned database.

BACKGROUND OF THE INVENTION

A database is partitioned primarily for administrative purposes, wherein a partition is defined in terms of a range of keys, either primary or secondary, to records in a table. Partitions allow a database administrator (DBA) to add, delete, or change information for a range of records in a table. For example, if some data within a partition of the table is no longer valid, the DBA can remove the partition that contains invalid data and then restore the valid data to the partition. Without partitions, the DBA would have to remove the entire table and restore the valid data, thereby making the entire database inaccessible to users. The partitions allow a user to continue to access some portions of a table while another portion of it has been removed for maintenance.

For some database applications, such as a data warehouse, users are typically limited to selecting records according to user-specified selection criteria. Thus, users are not permitted to insert, update, or delete records from the data warehouse. Data warehouses also tend to have very large storage requirements, often in the terabyte range. The large storage requirements can lead to more active administration of the partitions of the database. That is, partition ranges may need to be actively managed.

Removing a partition for administrative purposes may be appropriate in some circumstances, for example, when the partition contains invalid data. Since the data is invalid, user visibility of the data is undesirable. In other circumstances, however, removing a partition may be undesirable since user visibility of the data is important. For example, if an administrator is realigning partitions, in a data warehouse, users may require continued visibility of the records in the subject partitions.

A method and apparatus that addresses the aforementioned problems, as well as other related problems, are therefore desirable.

SUMMARY OF THE INVENTION

A method and apparatus for managing a database having a plurality of partitions are provided in various embodiments. The database is managed by users of a first user class and accessible to users of a second user class. Respective partition states are established for the partitions of the database, and access is provided to users of the first user class to partitions having a first partition state. Users of the second user class are denied access to partitions having the first partition state, and users of the second user class are provided access to partitions having a second partition state.

In accordance with another embodiment of the invention, a computer program product is provided to be operable to manage a database having a plurality of partitions, wherein the database is managed by users of a first user class and accessible to users of a second user class The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
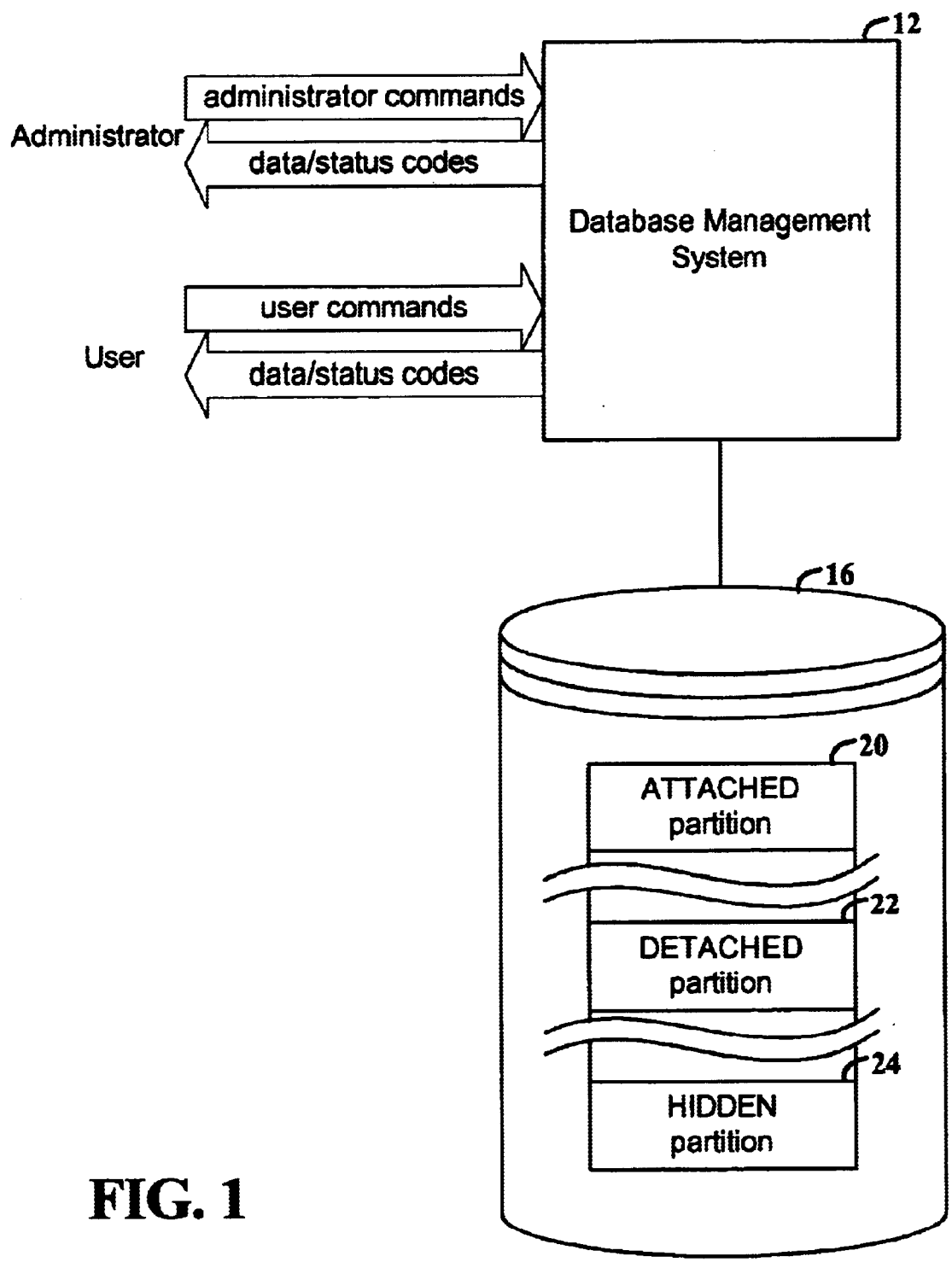
FIG. 1 is a block diagram that illustrates a database management system (DBMS) that provides access to a partitioned database.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

FIG. 1 is a block diagram that illustrates a database management system (DBMS) that provides access to a partitioned database. DBMS 12 provides access to database 16 for administrators and users. Example database 16 is comprised of a plurality of partitions, including partition 20 which is in an ATTACHED state, partition 22 which is in a DETACHED state, and partition 24 which is in a HIDDEN state. In accordance with an example embodiment of the invention, a database administrator can place partitions of a database in different states, depending on the operations to be performed. The partition states dictate the user operations that are valid and are described below.

DBMS 12 processes input commands from users and administrators. In the example embodiment, user commands are commands such as those set forth in the generally known Structured Query Language (SQL), and administrator commands are commands that are not generally available to the user community.

In accordance with one embodiment, a partition can be ATTACHED, DETACHED, or HIDDEN. Each of the states indicates the accessibility and visibility of data in the associated partition. The accessibility of a partition determines whether the data contained therein can be manipulated (inserted, updated, deleted, loaded, unloaded, or erased) by a user. The accessibility characteristic is designated as either ACCESSIBLE or INACCESSIBLE. If a partition is ACCESSIBLE to SQL, records can be manipulated using SQL commands. Records in an INACCESSIBLE partition cannot be manipulated. Administrator commands, other than ERASE, can manipulate both ACCESSIBLE and INACCESSIBLE partitions.

The visibility of a partition determines whether an SQL user has visibility to data in the partition. The visibility characteristic is designated as either VISIBLE or INVISIBLE. An attempt to retrieve a record from an invisible partition always results in a "no-find" code. The retriever is unaware of the existence of the partition. An attempt to use SQL to otherwise manipulate (insert, update, or delete) a record in an invisible partition always results in an error message. When a partition is visible the user is aware of the existence of the partition and the records that satisfy the WHERE clause of a query are retrieved or otherwise manipulated. Administrator retrieval commands are not impacted by a partition being INVISIBLE.

An ATTACHED partition is VISIBLE and ACCESSIBLE to a user via SQL. ATTACHED is the normal state of a partition. Thus, the user knows of the existence of an ATTACHED partition and can manipulate (retrieve, insert, update, delete, load, unload) the partition via SQL. However, the user cannot use an administrator command to erase a partition in an ATTACHED state.

A DETACHED partition is VISIBLE, but the data is INACCESSIBLE to SQL users. An SQL user knows of the existence of the DETACHED partition but cannot manipulate (retrieve, insert, update, delete, unload) records in the partition. A partition can be placed in the DETACHED state, for example, when corruption has been detected for the partition. In this scenario, the administrator can DETACH the partition and then reload or recover the partition data from a backup copy. This allows users visibility as to the existence of the data, but does not allow the user to manipulate the data in the partition. When a user references a DETACHED partition with, for example, a read, DBMS 12 returns a message indicating that the partition is DETACHED.

A HIDDEN partition is INVISIBLE and INACCESSIBLE. Thus, an SQL retriever is unaware of the partition's existence. However, to an administrator, a HIDDEN partition is both visible and accessible. The administrator can use the HIDDEN state to load new partitions for which visibility to SQL users is not desired. When a user references a HIDDEN partition, DBMS responds by indicating that there is no data in the referenced partition. An attempt by a user to manipulate (insert, update, or delete) a record in a HIDDEN partition results in an error message to user indicating that the referenced data is in a HIDDEN partition. An attempt by a user to retrieve data (read) data from a HIDDEN partition results in an error message indicating that the referenced data does not exist. If a retrieval query spans both ATTACHED and HIDDEN partitions, records from the ATTACHED partitions are returned and counted, and referenced data in HIDDEN partitions is not returned or counted.

If a table has both a primary key and secondary indices, and the primary key is partitioned, then the states of the primary partitions will dictate whether records are accessible when reference is made via a secondary index. For example, if a primary key partition is DETACHED or HIDDEN, a record within the primary key partition that is referenced via a secondary key is treated as DETACHED or HIDDEN. A COUNT SQL command of records using the secondary index does not read the records of a HIDDEN primary key partition that includes records referenced by the secondary index. However, a COUNT SQL command of records using the secondary index will return an error if a DETACHED primary key partition includes records referenced by the secondary index.

Figure 2:
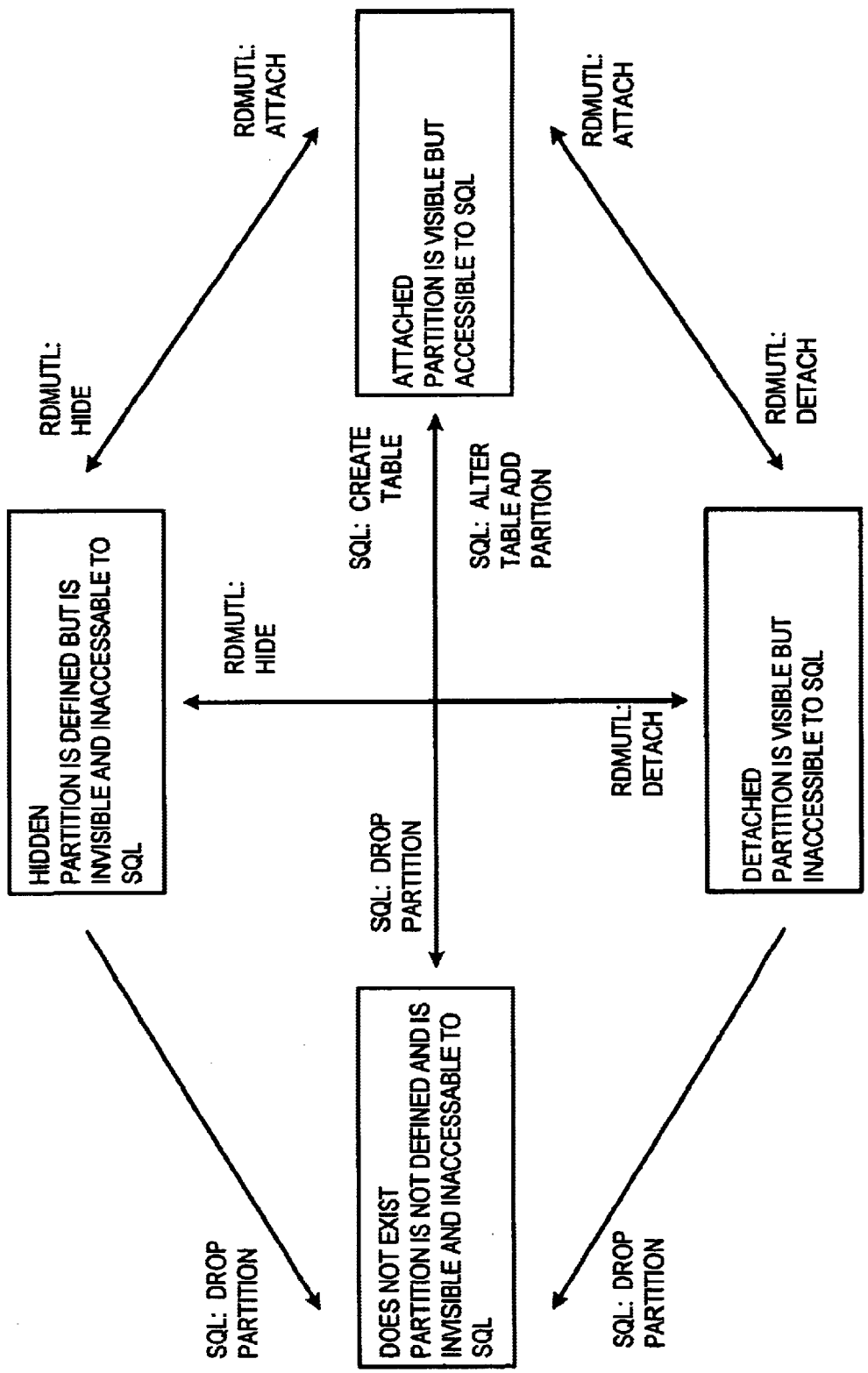
FIG. 2 is a state transition diagram showing the relationship between the partition states HIDDEN, ATTACHED, and DETACHED.

FIG. 2 is a state transition diagram showing the relationship between partition states HIDDEN, ATTACHED, and DETACHED. When a partition is deleted or "dropped," any subsequent reference to the partition results in DBMS 12 returning a status, DOES NOT EXIST. There are two types of commands, SQL and RDMUTL, which cause transitions between states.

SQL commands include ALTER TABLE, DROP PARTITION, CREATE TABLE, CREATE INDEX, and ALTER TABLE ADD PARTITION. In addition, for the CREATE TABLE, CREATE INDEX and ALTER TABLE ADD PARTITION commands, processing includes establishing an initial partition state of ATTACHED. Thus, newly created tables partitions are visible and accessible.

RDMUTL, which is short for relational data management utility, commands refer to those that are used for administration of the database. The RDMUTL commands relative to the present invention include HIDE, DETACH, and ATTACH. The HIDE command causes a referenced partition to transition from the DETACHED or ATTACHED state to the HIDDEN state. The DETACH command causes the referenced partition to transition from the HIDDEN or ATTACHED state to the DETACHED state. The ATTACH command causes the referenced partition to transition from the HIDDEN or DETACHED state to the ATTACHED state.

Figure 3:
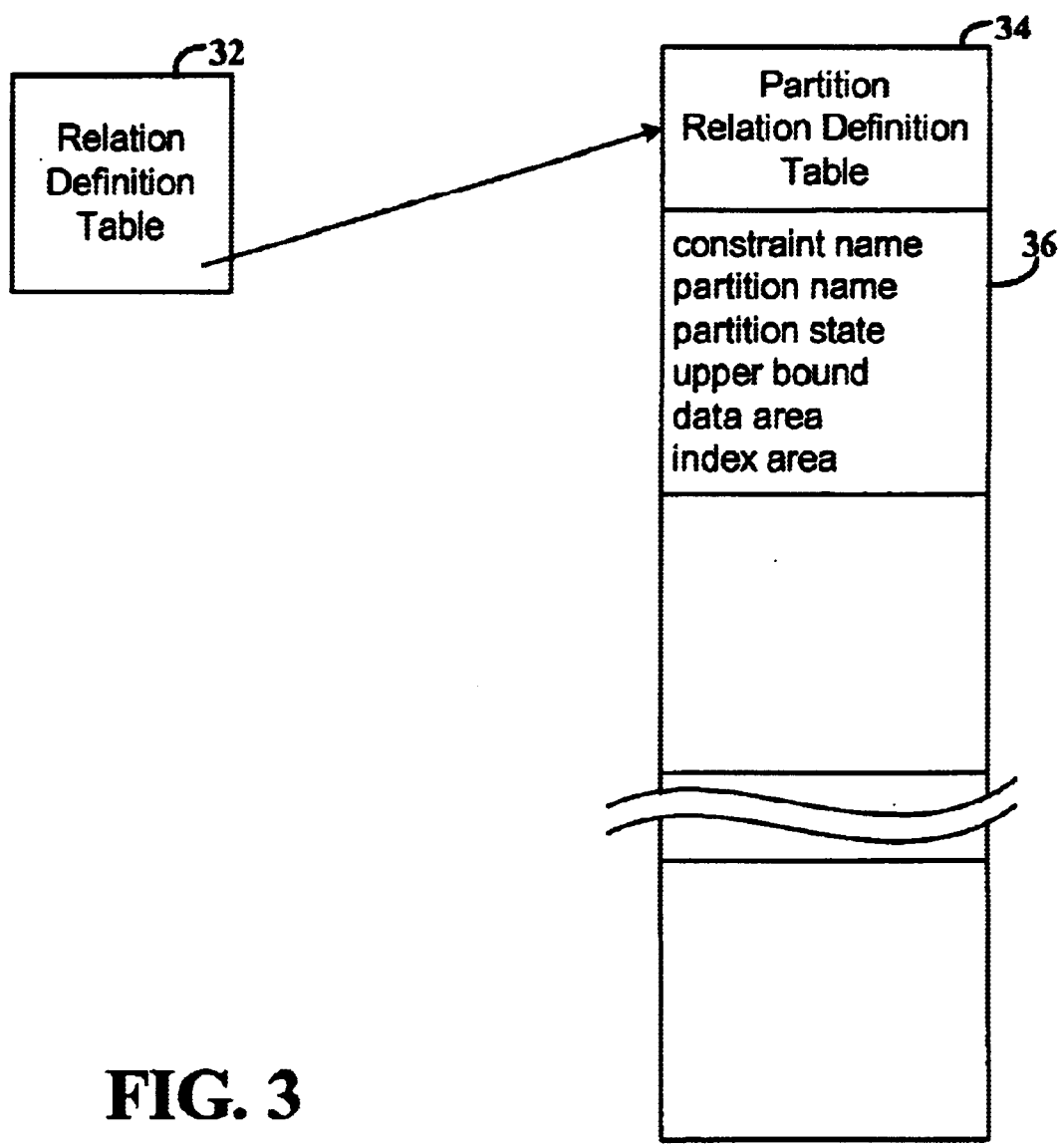
FIG. 3 is a block diagram that illustrates the relationship between a Relation Definition Table (RDT) and a Partition Relation Definition Table (PRDT)

FIG. 3 is a block diagram that illustrates the relationship between Relation Definition Table (RDT) 32 and Partition Relation Definition Table (PRDT) 34. RDT 32 is a modified version of a table used in a prior implementation of DBMS 12. RDT generally contains format information internal to DBMS 12 of a table definition. In one embodiment, RDT 32 also indicates which, if any, indices are partitioned. RDT 32 references PRDT 34 if the table is partitioned.

PRDT 34 is used to store information related to the partitions of the table. Each database table has its own PRDT, and each entry 36 of PRDT 34 includes a constraint name, partition name, partition state, upper bound, data storage area, and index storage area. The constraint name indicates of which index the associated partition is a part. The "partition name" is the identifier by which the partition can be referenced. The state of the partition is stored as the "partition state", and the "upper bound" of a partition is the maximum key value that can be stored in the partition. "Data area" references the storage area for data elements within the partition, and "index area" references the storage area for indices referencing the partition.

Figure 4:
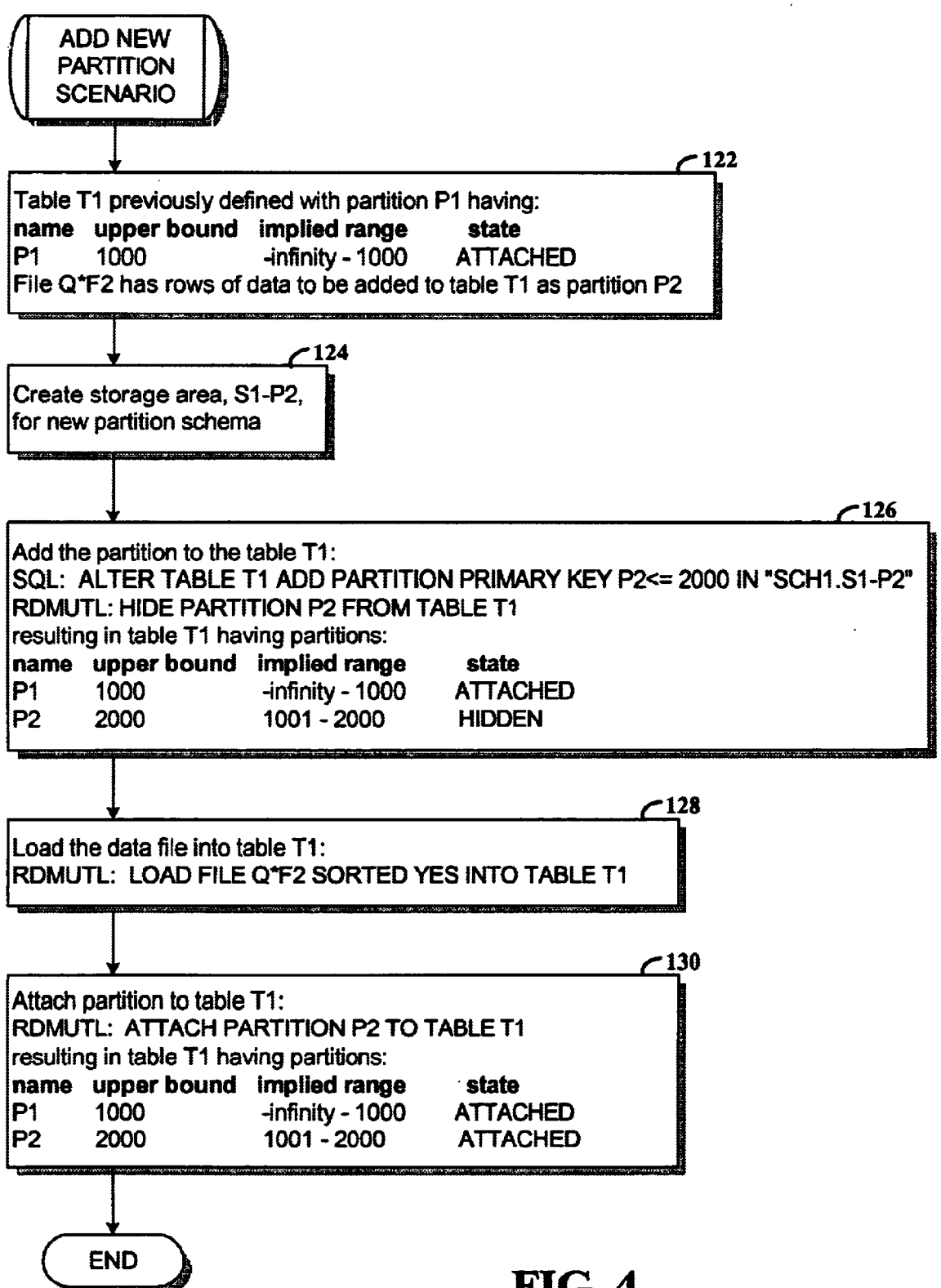
FIG. 4 is a flow chart illustrating a scenario in which a new partition is added to an existing database.
Figure 5:
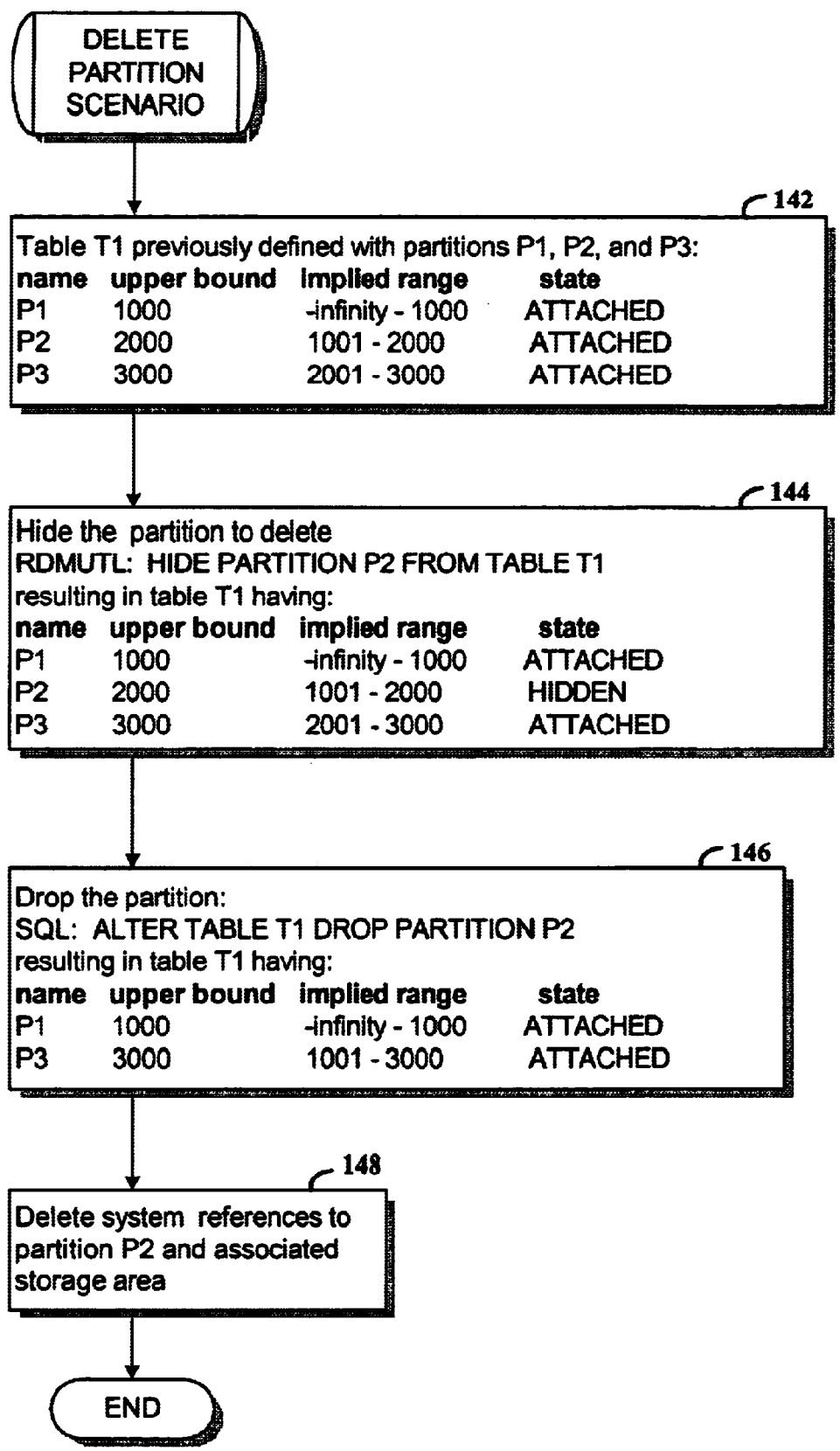
FIG. 5 is a flowchart of an example scenario for deleting a partition in accordance with an example embodiment of the invention.
Figure 6:
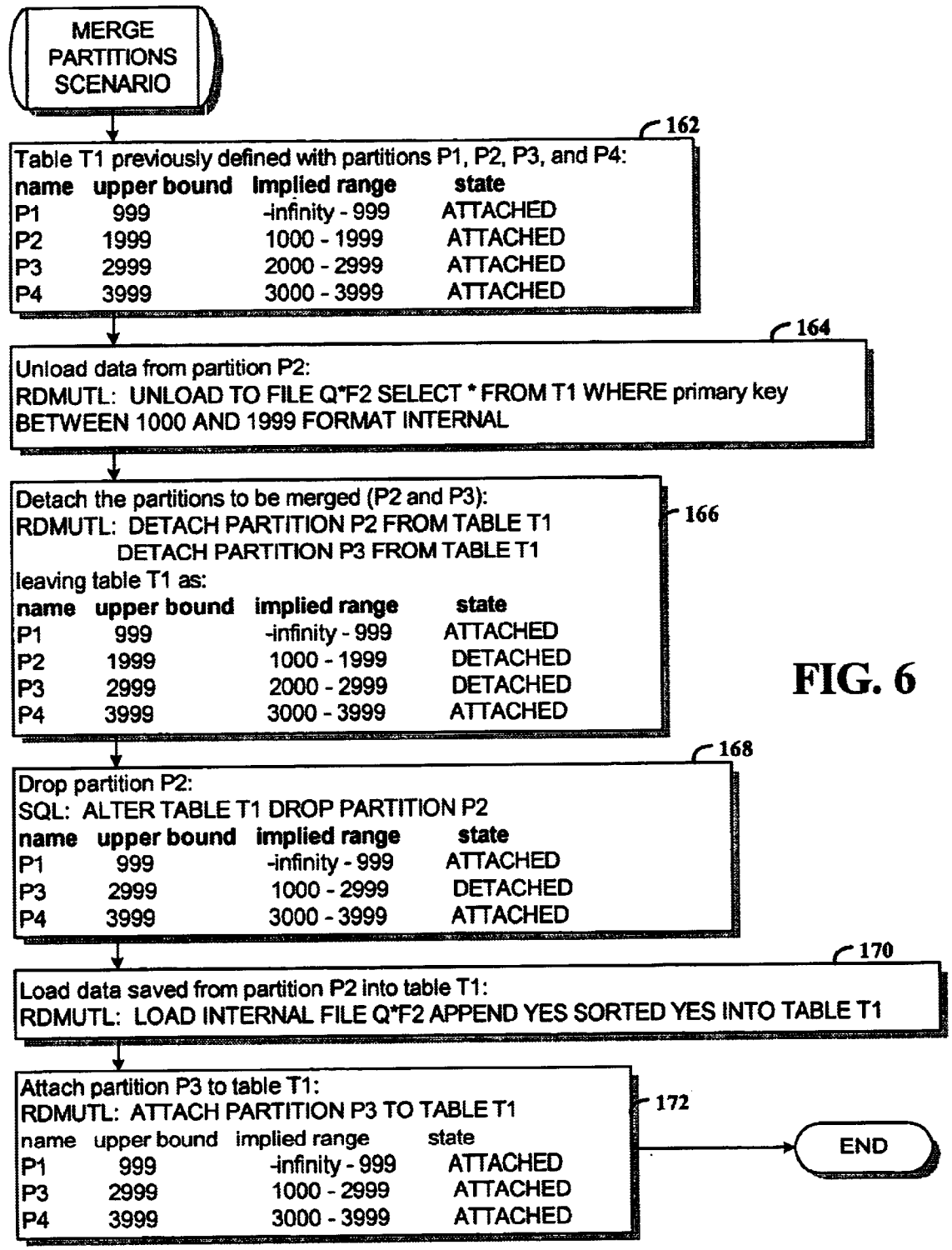
FIG. 6 is a flowchart of an example scenario for merging two partitions.

FIGS. 4, 5, and 6 illustrate three example scenarios in which the partition states of the present invention may be used. FIG. 4 is a flow chart illustrating a scenario in which a new partition is added to an existing database. The flowchart shows how to create a new partition P2 in a table T1 that already has defined partition P1. It is also assumed for this scenario that each secondary index partition must also be detached, loaded, and then attached. The same process can be followed to initially create partition P1.

At step 122, table T1 is shown as having been previously defined with partition P1. Partition P1 has an upper bound of 1000, an implied range of −infinity to 1000, and a state of ATTACHED. The upper bound of 1000 is the largest key value that can be placed in the partition. File Q*F2 has rows of data to be added to table T1 as partition P2.

A new storage area is created at step 124 for storing the new partition. The storage area is referenced as S1-P2. At step 126, the new partition P2 is added to table T1 using the SQL command ALTER TABLE ADD PARTITION, and the partition state is made HIDDEN using the RDMUTL command HIDE PARTITION. New partition P2 has an upper bound of 2000, and implied range of 1001 to 2000, and a state of HIDDEN.

At step 128, the data file is loaded into table T1 using the LOAD FILE command. After the data from the data file has been loaded into the table, the SQL query SELECT COUNT (*) FROM T1 would return the number of records in partition P1 since P2 is hidden. The state of the partition is then changed to ATTACHED using the ATTACH PARTITION command at step 130. After partition P2 has been attached, the data records therein are visible and accessible by SQL. Thus, the SQL query SELECT COUNT(*) FROM T1 would return the number of records in P1+P2.

It will be appreciated that a partition can be repopulated by hiding the partition, erasing records within the partition, loading new data into the table, and attaching the partition after the load is complete.

FIG. 5 is a flowchart of an example scenario for deleting a partition in accordance with an example embodiment of the invention. Step 142 shows that table T1 is initially defined with partitions P1, P2, and P3 with the respectively associated upper bounds, implied ranges, and states. At step 144, the partition to delete, P2, is hidden using the HIDE PARTITION command. Partition P2's state is shown as having changed to HIDDEN. After partition P2 is HIDDEN from table T1, an SQL INSERT of a row with a primary key value of 1500 would fail because the record is in the implied range of P2 which is HIDDEN.

At step 146, partition P2 is dropped using the SQL command, ALTER TABLE DROP PARTITION. After partition P2 has been dropped, the implied range of keys of P3 will include 1001–3000. The last step 148 the system references to the dropped partition are deleted as well as any associated storage areas for P2's partition information.

FIG. 6 is a flowchart of an example scenario for merging two partitions. As shown at step 162, table T1 is defined as having partitions P1, P2, P3, and P4. At step 164, data from partition P2 is unloaded to temporary file Q*F2. The states of partitions P2 and P3 are then changed to DETACHED at step 166 using the DETACH PARTITION command.

If during the administrative operation of merging the partitions, a user submits an SQL SELECT command, an error message is returned indicating that the selected records are detached. The user thereby has visibility as to the existence of the records in the partition.

At step 168, partition P2 is dropped using the ALTER TABLE command, leaving as remaining partitions P1, P3, and P4. The implied range of P3, 1000–2999, includes the implied range of dropped partition P2. The saved data from dropped partition P2 is then loaded into table T1 at step 170. The data from file Q*F2 is used to populate partition P3 with primary key range from 1000–1999. These rows are merged with the existing rows in P3 that are in the key range 2000–2999.

At step 172, the state of partition P3 is changed to ATTACHED using the ATTACH PARTITION command. The data in partition P3 then once again visible and accessible.

Accordingly, the present invention provides, among other aspects, a method and system for administering database partitions. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for managing a database having a plurality of partitions, wherein the database is managed by users of a first user class and accessible to users of a second user class, comprising:

establishing respective partition states for the partitions of the database, wherein the partition states are selected from the group of attached, detached, and hidden;

in response to a request from a user of the second class for access to data in an attached partition, providing access to the data referenced in the request;

in response to a request from a user of the second class for access to data in a detached partition, denying access and indicating that data referenced in the request is in a detached partition; and in response to a request from a user of the second class for retrieval of data in a hidden partition, denying access and indicating that data referenced in the request does not exist.

2. The method of claim 1, further comprising changing states of selected partitions in response to input commands from users of the first class.

3. The method of claim 2, further comprising changing states of selected partitions in response to input commands from users of the first class.

4. The method of claim 3, further comprising denying a request by a user of the second class for changing a state of a partition.

5. The method of claim 1, wherein the database has a primary key and one or more secondary indices, the partitions being of the primary key and further comprising, in response to a request from a user of the second class for access via a secondary index to data in a detached partition, denying access and indicating that data referenced in the request is in a detached partition.

6. The method of claim 5 further comprising, in response to a request from a user of the second class for retrieval via a secondary index of data in a hidden partition, denying access and indicating that the data referenced in the request does not exist.

7. The method of claim 1, further comprising linking a partition definition table to a relation definition table for the database; and storing partition information for the respective partitions in the partition definition table.

8. The method of claim 7, wherein the partition information includes a partition name and a partition state.

9. The method of claim 8, wherein the partition information includes an upper bound of keys of records in the respective partition.

10. A computer-implemented method for managing a database having a plurality of partitions, wherein the database is managed by an administrator and accessible to a user, comprising:

selectively establishing at least one of the partitions as a hidden partition that is invisible and inaccessible to the user;

returning an error code in response to a user query referencing data within the hidden partition, the error code indicating that the data referenced in the query was not found; and permitting maintenance functions to be performed by the administrator on the data within the hidden partition.

11. The method of claim 10, further comprising:

loading data into the hidden partition; and changing the hidden partition to a partition that is visible and accessible to the user.

12. The method of claim 10, further comprising dropping the hidden partition.

13. The method of claim 10, further comprising:
   erasing the data in the hidden partition;
   loading new data into the hidden partition; and
   changing the hidden partition to a partition that is visible and accessible to the user.

14. The method of claim 10, further comprising indicating that referenced data is in a hidden partition in response to insert, update, and delete user queries.

15. An apparatus for managing a database having a plurality of partitions, wherein the database is managed by users of a first user class and accessible to users of a second user class, comprising:
   means for establishing respective partition states for the partitions of the database, wherein the partition states are selected from the group of attached, detached, and hidden; and means for providing access to the data referenced in the request in response to a request from a user of the second class for access to data in an attached partition;

means for denying access and indicating that data referenced in the request is in a detached partition in response to a request from a user of the second class for access to data in a detached partition; and means for denying access and indicating that data referenced in the request does not exist in response to a request from a user of the second class for retrieval of data in a hidden partition.

* * * * *

UNITED STATES PATENT AND TRADEMARK OFFICE
CERTIFICATE OF CORRECTION

PATENT NO.     : 6,768,985 B1
DATED          : July 27, 2004
INVENTOR(S)    : James M. Plasek and John C. Rust It is certified that error appears in the above-identified patent and that said Letters Patent is hereby corrected as shown below:

Column 7,
Line 15, "hidden; and" should read -- hidden; --.

Signed and Sealed this

Twenty-fourth Day of May, 2005

JON W. DUDAS
*Director of the United States Patent and Trademark Office*